Feb. 20, 1934.  A. HOERBIGER ET AL  1,948,375
ANNULAR VALVE
Filed Nov. 4, 1930  2 Sheets-Sheet 1
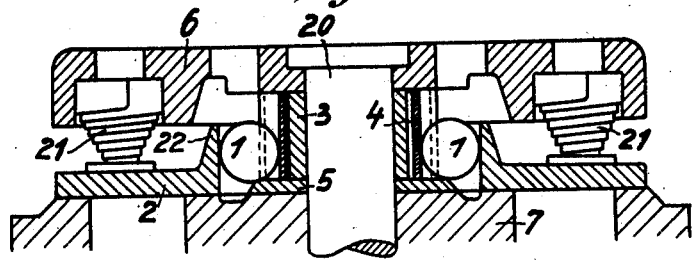
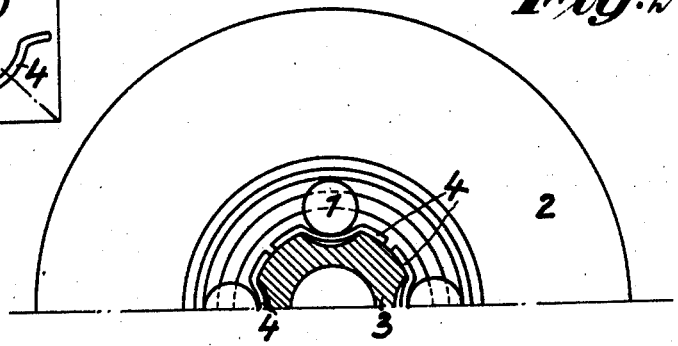
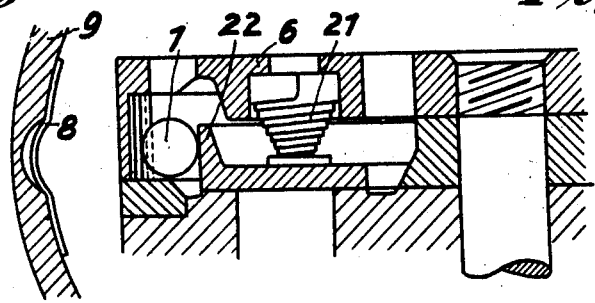
INVENTORS
ALFRED HOERBIGER
ROBERT KOHLER
by their attorneys
Howson and Howson

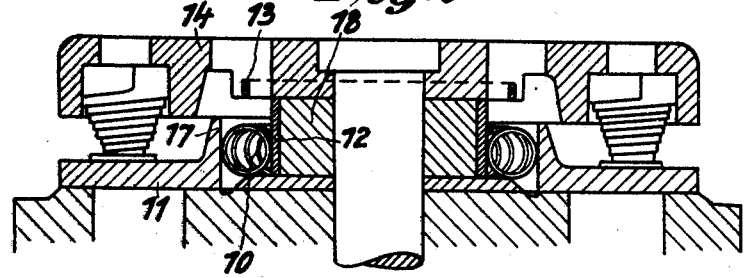
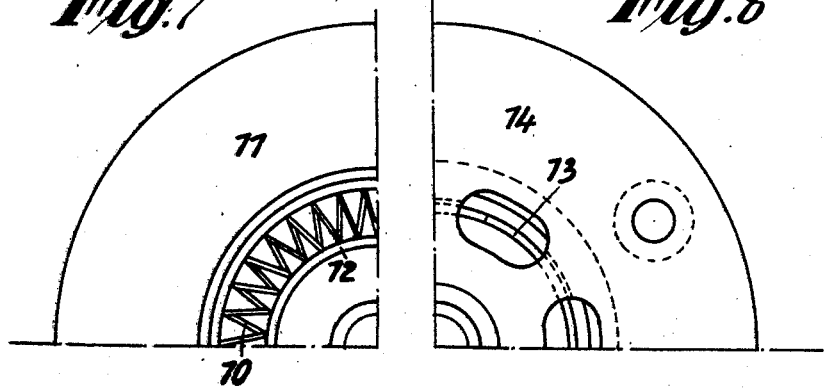
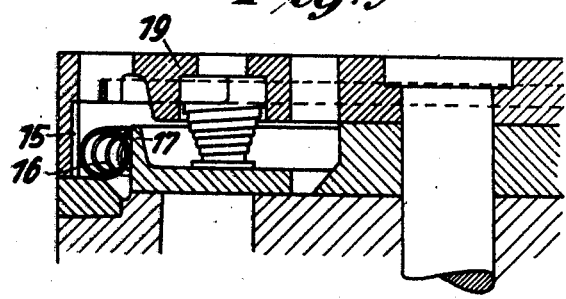

Patented Feb. 20, 1934

1,948,375

UNITED STATES PATENT OFFICE 1,948,375

ANNULAR VALVE

Alfred Hoerbiger, Mauer, near Vienna, and Robert Köhler, Vienna, Austria, assignors to the firm Hoerbiger & Co., Mauer, near Vienna, Austria, a company of Austria Application November 4, 1930, Serial No. 493,436, and in Austria November 5, 1929

3 Claims. (Cl. 251—144)

In the construction of automatic valves for piston operated machines such as pumps, blowers, compressors or the like the tendency has been to guide the moving parts without friction as far as possible besides reducing the weight and utilizing the available space to the greatest extent possible.

In the annular plate valves heretofore known, which have been guided slidingly, the parts undergoing friction have been subject to wear while the annular valves of the type having elastic links cut in the valve plate or secured thereto required more space for the accommodation of the said links.

Now according to the present invention the friction due to guiding is reduced to a minimum without increasing the space required, by interposing rolling elements between the valve body and the guiding body. The rolling elements may be balls, rollers or cylindrically wound helical springs.

In the annexed drawings several embodiments of the invention are illustrated by way of example.

Fig. 1 is a central vertical section of an annular valve in which balls are used as rolling elements.

Fig. 2 is a plan view thereof, the valve stop being removed.

Fig. 3 shows a detail of Fig. 2 on a larger scale.

Fig. 4 is a part of a vertical central section of a modified constructional form of the valve and Fig. 5 shows a detail thereof in horizontal section.

Fig. 6 is a vertical central section of a further modification of the present valve.

Fig. 7 is half a plan view thereof with the valve stop removed and

Fig. 8 is half a plan view thereof with the valve stop in position.

Fig. 9 shows still another modification in vertical central section.

Referring to Figs. 1 and 2 the annular valve body 2 is provided with an upwardly projecting flange 22 forming a cylindrical surface having its generatrices parallel to the axis of the valve body, this cylindrical surface serves as a running surface for the balls 1. The valve stop 6 in the form of a plate rests on one of the end faces of the cylindrical guiding element 3 surrounding the bolt 20. The other end face of the guiding element rests on the valve seat 7 or upon a washer 5. Flat springs 4 are located in grooves of the guiding element 3 which grooves are parallel to the axis of the valve and which constitute the other running surface for the balls 1. An initial tension is imparted to the springs 4 on bringing them into position so that they permanently force the balls against the running surface on the flange 22. When free from tension the springs 4 have the cross sectional shape shown in Fig. 3. Coiled springs 21 are interposed between the valve body 2 and valve stop 6.

Whenever the valve body rises it takes with it the balls and rolls on them, as will be readily understood, so that the friction due to the guiding is reduced to a minimum. The dimensions of the guiding surface on the annular flange 22 and of the grooves in the guiding element 3 and of the springs 4 are such that the balls 1 can never come off the guiding surfaces during the movements of the valve.

The use of the springs 4 not only offers the advantage of positively causing the balls to be moved along with the valve, but also the further advantage that the guiding elements may be readily exchanged.

In the embodiment of the present invention illustrated in Figs. 4 and 5 the running surfaces for the balls are formed by a flange 22 at the outer circumference of the valve ring and by springs 8 mounted in guiding grooves in the cylindrical part 9 of the valve stop 6.

In the embodiment of the present invention shown in Fig. 6 the rolling element consists of a cylindrically wound helical spring 10 which has the same effect as a number of rolling rings equal to the number of convolutions of the spring. The helical spring is forced against the flange 17 of the annular valve 11, by the elastic ring 12 surrounding the guiding body or element 18 and constructed as a split cylinder tending to expand outwards. A ring 13 is secured to the valve stop 14 and serves for limiting the movement of the spring 10.

In the embodiment of the present invention shown in Fig. 9 also a helical spring 16 similar to the helical spring 10 is used as the rolling body which bears on the one hand against the flange 17 on the outer circumference of the valve body and on the other hand against an elastic ring 15 located in a recess in the cylindrical part of the valve stop 19. In this case the ring 15 must, of course, tend to expand inwards.

What we claim is:

1. In combination with an annular valve and a valve seat therefor, a substantially circular guiding surface on the said annular valve, a substantially circular guiding surface stationary relatively to the said valve seat and concentric to the said circular guiding surface on the annular valve and rolling elements interposed between and contacting with both the said substantially circular guiding surfaces, one of the said substantially circular guiding surfaces being provided with axially arranged elastic elements adapted to force the rolling elements against the other guiding surface.

2. In combination with an annular valve and a valve seat therefor, a substantially circular guiding surface on the said annular valve, a substantially circular guiding surface stationary relatively to the said valve seat and concentric to the said circular guiding surface on the annular valve and rolling elements interposed between and contacting with both the said substantially circular guiding surfaces, one of the said substantially circular guiding surfaces being provided with axially arranged grooves and axial springs located in the grooves and adapted to force the rolling elements against the other guiding surface.

3. In combination with an annular valve and a valve seat therefor, a substantially circular guiding surface on the said annular valve, a substantially circular guiding surface stationary relatively to the said valve seat and concentric to the said circular guiding surface on the annular valve, a circularly bent cylindrical helical spring and an elastic circular ring mounted on one of the said substantially cylindrical surfaces and tending to expand towards the other cylindrical surface, the said helical spring being interposed between and contacting with the elastic ring and the cylindrical surface opposite thereto.

ALFRED HOERBIGER.
ROBERT KÖHLER.